US005895725A

United States Patent [19]

Caughlin

[11] Patent Number: 5,895,725

[45] Date of Patent: Apr. 20, 1999

[54] HIGHWAY LANE DELINEATOR BUTTONS AS MOTIVATIONAL GIFTWARE

[76] Inventor: Ronald G. Caughlin, 4766 San Rafael Ave., Las Vegas, Nev. 89120

[21] Appl. No.: 08/620,040

[22] Filed: Mar. 21, 1996

Related U.S. Application Data

[66] Substitute for application No. 07/449,979, Nov. 24, 1989, abandoned.

[51] Int. Cl.$^{6}$ .............................. B32B 3/00; B43M 17/00

[52] U.S. Cl. ...................................... 428/542.2; 428/542.4; 428/192; 428/195; 428/78; 428/903.3; 428/913.3; 40/358; D19/82; D19/84; 156/60

[58] Field of Search ................................ D19/84–86, 81, D19/82; 40/334, 358; 428/77, 78, 542.2, 542.4, 903.3, 913.3; 156/60

[56] References Cited

U.S. PATENT DOCUMENTS

| | | | |
|---|---|---|---|
| D. 160,030 | 9/1950 | Strauss . | |
| D. 164,616 | 9/1951 | Weiner | D19/84 |
| D. 165,908 | 2/1952 | Cleary | D19/84 |
| D. 217,700 | 5/1970 | LaBell | D19/36 |
| D. 255,587 | 6/1980 | Dane | D19/85 |
| D. 255,695 | 7/1980 | Yu | D19/84 |
| D. 257,991 | 1/1981 | Bestler et al. | D19/36 |
| D. 257,992 | 1/1981 | Grunstad | D19/36 |
| D. 264,606 | 5/1982 | Pinera et al. . | |
| D. 286,792 | 11/1986 | Foster . | |
| D. 352,069 | 11/1994 | Doolin . | |
| 1,374,687 | 4/1921 | Stilwell . | |
| 3,630,815 | 12/1971 | Rosa . | |
| 3,647,279 | 3/1972 | Sharpless et al. | 350/303 |
| 3,902,818 | 9/1975 | Boone | 404/10 |
| 4,088,416 | 5/1978 | Taylor | 404/16 |
| 4,668,120 | 5/1987 | Roberts | 404/12 |
| 4,905,828 | 3/1990 | Dods | 206/335 |
| 5,119,932 | 6/1992 | Semanoff . | |

OTHER PUBLICATIONS

U.S. Dept. of Transportation, Public Service Message, "You Could A Lot From A Dummy—Vince and Larry", ©1991.

Tyco advertising on blister packaged toy titled "Crash Dummies" Tyco Industries, Moorestown, N.J. 08057, ©1991.

Sales sheet for Marker Supply, Ontario, Ca. 91761 (Date Not Given).

Three sales brochures for Ray-O-Lite, Heath, Oh 43056 (Date Not Given).

*Primary Examiner*—Marie Yamnitzky

[57] ABSTRACT

A safety oriented article of giftware is provided by fastening a cushioning pad (15) to the coarse underside of a rectangular highway pavement lane delineator marker button (10), or a circular convex button (20). This modification structurally alters the function of buttons (10, 20) to serve as a safety catalyst for traversing the imaginary highway of life. Added structural accoutrements, such as a plaque (30), a conventional audio device (22), and a pen funnel (36) further modifies the buttons (10, 20) to provide a greater use of their safety stimuli. Also, caricatures, or images of famous or well-known persons, places and things may be used to provide a new tool and method of creating information, both visual and auditory, so that organizations can convey safety and quality assurance in products and services. Structurally modifying buttons (10, 20) greatly broadens the use of their normally passive, inert safety stimuli, and brings their catalytic safety qualities to the fore. Buttons (10, 20) provide the readily recognizable reference point for safety marking today's superhighway of life.

18 Claims, 2 Drawing Sheets

HIGHWAY LANE DELINEATOR BUTTONS AS MOTIVATIONAL GIFTWARE

CROSS-REFERENCE TO RELATED APPLICATION

This application is a substitute for my prior application Ser. No. 07/449,979, filed Nov. 24, 1989, now abandoned.

BACKGROUND

1. Field of Invention

This invention generally relates to giftware, and in particular, to an improved method and process of providing greater use of a normally passive and inert object.

2. Description of Prior Art

Generally, safety awards and inspirational, motivational giftware vary widely, with most being inappropriate to marginally adequate. Various gadgets and items have been marketed even though they are totally lacking in inspirational qualities, any connection to safety motivation, or any factors which capitalize on previously learned safety lessons.

Also, many references can be found in literature, poems, and songs mentioning an imaginary "Highway of Life". This highway can be more successfully traversed and navigated with guideposts and markings.

A common problem in today's fast paced mechanized society is how to foster, promote, and emphasize personal and occupational safety, safety management processes, and safety in services and products succinctly, with an overall prudent, cautionary, or "BE CAREFUL" approach to traveling life's modern-day superhighway. A reference point is needed that is readily recognizable to the majority of the population.

By way of example, today's heavy dependence upon the automobile requires motorists to think, perform, and cooperate in all traffic situations to avoid accidents.

Heretofore there has not been any safety reminder to the motorist when off the highway and participating in mundane tasks and work.

Eg., U.S. Pat. No. 4,668,120 (1987) to Roberts relates to a self-contained solar-powered illuminated reflector for improved visibility at a distance as a traffic safety aid which is adapted to be placed or mounted upon a highway pavement or vertical surface or wall. This device merely extends the visual safety capacities of reflective markers on the motoring highways, but does not provide any guidance to the motorist who is not on the road.

Also, U.S. Pat. No. 4,088,416 (1978) to Taylor discloses an improvement on what is essentially a plunger type reflector residing in a sealed cavity housing. It requires a "region of resilient deformability", such as a spring or a foam material which allows the reflector assembly to return to its original position after the depressing force of a vehicle road wheel has been removed. In a preferred embodiment the region of resilient deformability comprises a sealed cavity formed at least in part by the body member of the stud. Thus the cavity may be formed wholly within the body member, or partly by the body member and partly by the surface of the road to which the body member is attached.

When a vehicle wheel contacts the road stud, part of it will be deformed into the cavity, and the reflector assembly will consequently be depressed. Upon removal of the depressing force, the cavity will resume its original shape and size and will restore the reflector assembly to its original position.

This internal "region of resilient deformability" can be a spring completely within the housing, and that there is no need to protect a road surface. Indeed, Taylor further teaches a method of attachment to the road surface by means of nails, studs or spikes, and that used and worn out road studs may be burned off the road surface if the stud is required to be removed for example for resurfacing operations.

By providing a "means for wiping the reflecting surface when a road wheel of a vehicle passes over the road stud", and pointing out that, "the body of the shell contains a filler which is formulated to absorb impacts from traffic", it is evident that Taylor intended his safety devices to serve and expire on the road surface; i.e, to clearly be left in the street.

U.S. Pat. No. 3,902,818 (1975) to Boone shows a portable traffic sign and cast iron bases. It has a convex top with a round bottom and is adapted to be permanently mounted along (or within) the boundries of a vehicle roadway. The placement of this vertical traffic sign in proximity to a vehicle's path of travel enables the driver to see the displayed traffic sign among all the other regulating signs and commercial advertisements, etc., which compete for the driver's attention. Also, the device employs two wedge-shaped disks which are rotatably adjustable with respect to each other for permanently attaching the base to the ground. A base for the post enables the sign to stand vertically. The post will shear off when struck by an errant vehicle and will securely hold a traffic sign against substantially any anticipated wind load, e.g., up to about 100 M.P.H.

Boone suggests a cast iron base from approximately 155 millimeters (6 inches) to approximately 310 millimeters (12 inches) Such a base is cumbersome and is suited only for use on a roadway.

Boone makes a distinction between regulating traffic signs and commercial advertising which indicates his device is solely oriented towards motor traffic control.

Marker Supply Co., of Ontario, Calif., and Ray-O-Lite Co., of Heath Ohio, are two prominent manufacturers of highway safety equipment, including pavement delineator buttons.

Delineator buttons are manufactured to be readily seen and heard when passed over on the highway and still remain unobstructive to a vehicle's passage or clearance. They are structured to function as visual and auditory guides.

Their shapes, which are thin circular convex, or narrow rectangles or squares, inhibit and deter persons from handling and picking them up.

Generally, the most popular style of highway lane delineator buttons are approximately 102 millimeters (4 inches), circular or square, with almost flat sloping or slanting sides, and usually no higher than 19 millimeters (¾ of an inch). They have a top surface area usually no greater than 64 millimeters (2½ inches) to 77 millimeters (3 inches), by 26 millimeters (1 inch) to 52 millimeters (2 inches).

This small top surface area is usually blank or imprinted with model numbers. It may carry the manufacturer's trademark which is also imprinted into the marker and only seen or observed by the installer at the time of static installation.

U.S. Pat. No. 4,905,828 (1990) to Dods shows a trading card which includes a picture of a logo-bedecked racing car and driver, and information relating thereto, as well as a plain display stand that provides the ability for retaining the trading card above and behind a miniature replica of the race car. The dull and lackluster display stand in this application adds nothing to the overall visual setting of what is required in a winning car and driver combination.

A public service message produced by the U.S. Department of Transportation is a "Vince and Larry" story which is entitled, "YOU COULD LEARN A LOT FROM A DUMMY", and specifically pertains to preventing or minimizing injuries during automobile accidents "Vince and Larry" have been somewhat hobbled through their cartoon style portrayal of accidents and injuries as play and fun to young minds. ("Vince and Larry", Copyright 1991, U.S. Department of Transportation).

Further detracting from this somewhat positive approach, Tyco Industries, Inc., of Moorestown, N.J., 08057, markets toys, sold under the trademarks, "CRASH DUMMIES, CRASH CARS, CRASH CHOPPER AND CYCLE, CRASH AND BASH CHAIRS and CRASH TEST CENTER", for children, ages 4 and up. An examination of the illustrated and written advertising from the packages for these toys indicate a blurred message is being sent by visually depicting accidents and injuries as "play and fun". Advertising, "Slick Explodes On Impact", and "Dummy Flies Apart", indicates a better solution to raising safety awareness is called for.

U.S. Pat. No. 3,647,279 (1972) to Sharpless et al. discloses a variable color display or aesthetic devices and means for enhancing the variable color patterns produced by the device for entertainment, advertising, aesthetic or decorative effects or purposes, and mentions paperweight and desk-pen holders among the numerous possibilities of devices. While versatile, the Sharpless device is merely ornamental in nature, which is usually the case with desk-pen sets and paperweights.

None of these references provides a way of exploiting and capitalizing on previously learned safety lessons. None of these references provides any safety lessons or motivational guidance for traversing the highway of life.

OBJECTS AND ADVANTAGES

It is a principal object of the invention to provide improved safety stimuli in non-highway areas, as well as utilizing previously learned safety lessons in highway of life situations.

Another object of the invention is to provide greater use of the passive safety guidance traits and exploitation of the presently unused cogent safety analogy catalystic stimuli inherent in highway marker buttons. Specifically, the present device improves the efficacy of safety awards in general, creates a more appropriate safe driving award, provides a novel designated-driver award, provides a new tool and method for creating indicia or information, both visual and auditory so that organizations can convey safety and quality assurance in products and services, and provides a new principle of operation for highway buttons such that any endeavor affiliated with or taking place upon highways has a tangible link with these buttons. Another object is to provide such buttons, which can be decorated to reflect the connection, and to provide a use for used and worn highway buttons as retirement medallions or certificates of merit in traversing life's superhighway.

SUMMARY

These and other objects are achieved in the present invention through greater exploitation of the safety triggering qualities and traits inherent in highway buttons. Highway lane delineator buttons are used as decorative desk ornaments, pen holders, etch, to provide motivational, inspirational, and enlightening messages along life's imaginary highway as safety catalysts.

REFERENCE NUMERALS IN DRAWINGS

Figure 1:
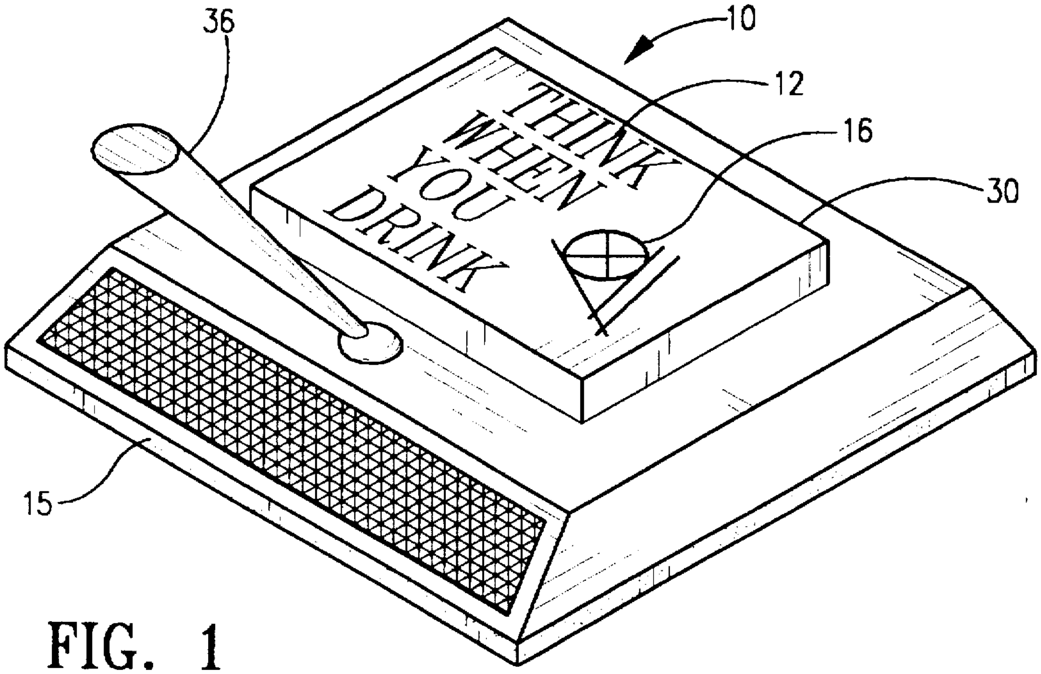
FIG. 1 is a perspective view of a rectangular highway delineator used as desk ornament according to the invention.

10 rectangular, square reflective delineator button
12 motivational, inspirational message
13 cartoon caricature
14 model-type replica
15 padding, cushioning
16 trademark
20 circular convex delineator button
22 radio, or tape player, or recorder; conventional audio device
25 aperture
30 information dispensing plaque
36 pen funnel

DESCRIPTION—FIG. 1—RECTANGULAR DEVICE

FIG. 1 is a perspective overall drawing of a rectangular highway delineator button 10, used as a desk ornament in accordance with the invention. Button 10 is a common pavement marker or button. It is a raised reflective pavement marker, having a widely used reflector known under the trademark "CATS EYE", and molded of optic grade methyl methacrylate (plastic). One of the most effective reflecting systems available. The well-known triple mirror reflex reflecting principle is thoroughly explained in Stimson U.S. Pat. No. 1,906,655, issued May 2, 1933. The internal filler (not shown) is of an inert thermosetting resin system meeting various state specifications for impact and wear resistance. A more detailed description can be found in U.S. Pat. Nos. 1,906,655 (1933) to Stimson, 3,332,327 (1967) to Heenan, 4,088,416 (1978) to Taylor, and 4,668,120 (1987) to Roberts. The external housing is molded of a high impact acrylonitrile-butadiene-styrene (ABS) compounds or polyester for durability.

Figure 2:
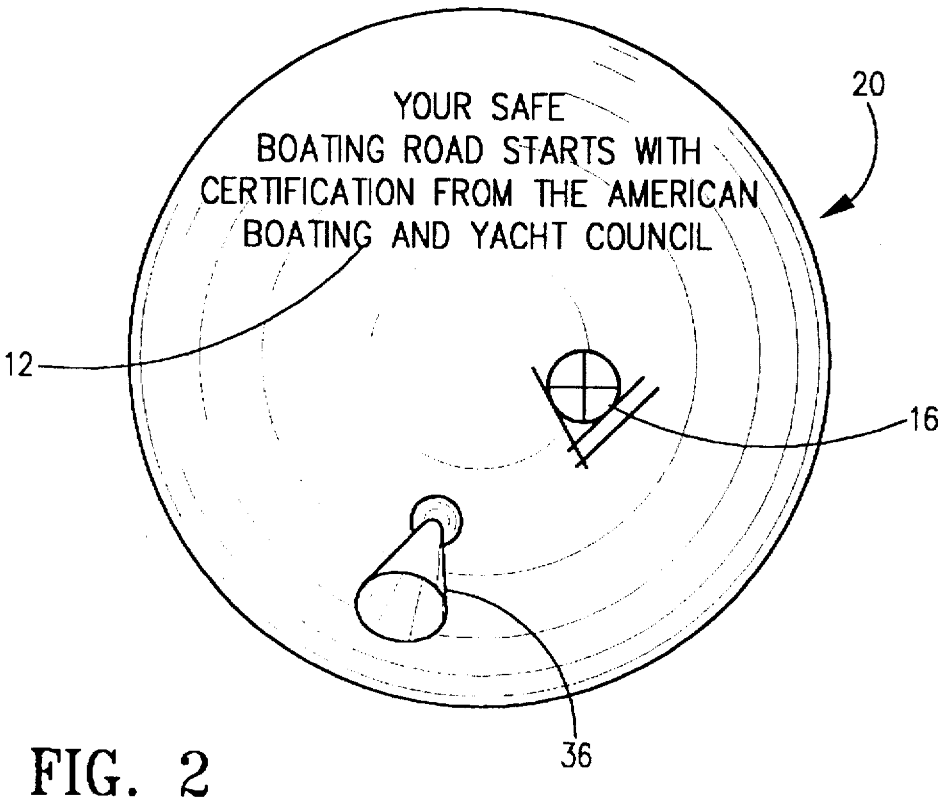
FIG. 2 is a top plan view of a circular convex delineator according to the invention.

Generally, the most popular style of lane markers are square buttons, such as button 10, and circular convex buttons, such as button 20 (FIG. 2). They are approximately 102 millimeters (4 inches) in diameter or square and have almost flat sloping or slanting sides. They are usually no higher than 19 millimeters (¾ of an inch). They have a flat top surface area usually no greater than 64 to 77 millimeters (2½ to 3 inches), by 26 to 52 millimeters (1 to 2 inches). This top surface area is usually blank or printed with model numbers. It may carry the manufacturer's marks which is generally imprinted and only seen or observed by the installer at the time of static installation. This top surface area has a substantially greater use potential as a virgin safety triggering and advertising promotional zone; buttons 10 and 20 are "safety catalysts".

Thus, any endeavor identifiable by a symbolic structure or image synergistically benefits when merged with the linchpin safety stimulating qualities of buttons 10 and 20. Safety advertising by famous or well-known persons, places or things, in conjunction with buttons 10 and 20, clearly creates and constitutes a new use for these safety generating devices.

For example, a motivational, inspirational, enlightening message 12, "Think When You Drink", as shown is placed upon a changeable information display plaque 30, which is fastened on top of button 10 by adhesive. A trademark 16 e.g., of the Miller Brewing Co., Milwaukee, Wis., is also prominently displayed. Button 10 structurally functions as a base housing host, or a pedestal, and dispenses its notably intrinsic and inherent safety stimuli as a "generator/applicator foundation".

The "forte", purpose, or specialty of button 10 is to generate safety guidance. This safety guidance image and aura has been building on the streets, and in the collective mind of motorists for years because of increased use and familiarity. This safety aura can be merged with, and applied to other "highway of life" situations. The safety stimulus aura generated by button 10 is transferred, associated, and applied to message 12 and trademark 16, and improves the overall effect.

Button 10 intensifies the visual message in the mind's eye. Thus, such an application and setting exploits the safety principles and catalytic qualities of button 10 to a greater degree. These qualities in turn can be applied to any endeavor along life's superhighway.

By installing plaque 30 on top of button 10 a fertile safety promotional zone, which has heretofore been ignored as a safety advertising medium, is used to provide a new and unique message carriers which is of a semi-permanent nature since it is difficult to pickup or move.

A supple cushioning pad 15 is fastened on the coarse underside of button 10 to provide a suitable foundation. By doing so, a clear change in structure as well as function takes place because pad 15 provides a non-marring surface for placement upon furniture and the like.

To overcome another designed in structural defect and provide for desktop use as a practical, safety motivational paperweight, a pen funnel 36 is also fastened to the top of button 10. Pen funnel 36 provides button 10 with the ability to structurally function in a totally new manner by providing a gripping or purchase point for movement.

Cushioning pad 15 and pen funnel 36 provide the structural and functional links for button 10 to function in a new mode: as a safety oriented message carrying billboard desk-pen paper-weight ensemble.

The device of FIG. 1 structurally functions as a safety sentinel guide along the imaginary—though now reified—highway of life. The device provides a greater use of the predetermined safety stimuli qualities of button 10 and creates and provides a new method and medium of raising safety perceptions: the blending of previously learned safety lessons in a new manner.

DESCRIPTION—FIGS. 2, 3, AND 4—CIRCULAR CONVEX DEVICE

FIG. 2 is a top plan view of an alternative safety promoting device. It uses a circular, convex-type highway lane delineator marker button 20. Button 20 represents another common pavement marker design which is usually made of metal, ceramic, or a high impact polyester or ABS plastic compound for durability A motivational, inspirational, enlightening message 12, such as, "Your Safe Boating Road Starts with Certification From The American Boating and Yacht Council" is provided on the top of button 20. A trademark 16 of the American Boating and Yacht Council is also prominently displayed. Thus, this organization, which is dedicated to improving the safety of recreational boaters, is able to provide and make greater use of highway related motoring safety lessons.

Figure 3:
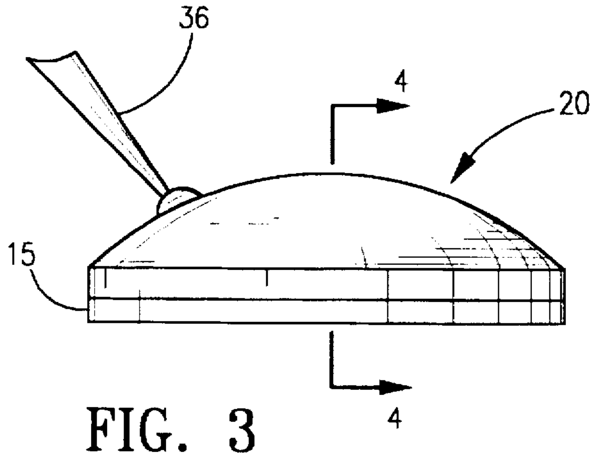
FIG. 3 is a front elevational view of the device of FIG. 2.

FIG. 3 is a front elevational view of the button of FIG. 2 and shows the general curvature of button 20. As in FIG. 1, padding 15 is fastened under button 20. Due to its curvature, it is difficult to pick up and move button 20.

Padding 15 on the coarse underside of button 20 changes its structure. Padding 15 provides button 20 with the ability to function as a safety related desk ornament.

Pen funnel 36 further provides a structural functional link for further altering and adapting button 20 into a practical safety motivating paperweight pen-holder.

Button 20 can now function as a safety catalyst on life's imaginary highway.

Figure 4:
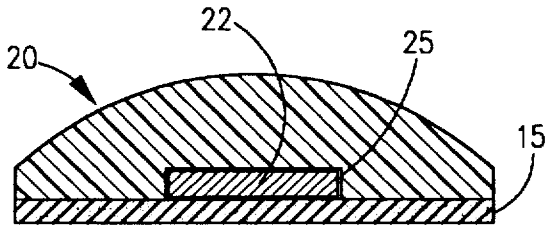
FIG. 4 is a cross-sectional view taken along the line 4—4 of FIG. 3.

FIG. 4 is a cross-sectional view taken along line 4—4 of FIG. 3. It shows how an additional feature—a radio, tape player, or recorder device 22 may also be provided Device 22 is embedded and fastened within a aperture 25 which is made by creating a recess in the underside of button 20. Pad 15 may be temporarily fastened to allow access to conventional audio device 22 for servicing or changing.

The provision of audio device 22 clearly provides button 20 (or button 10) with a new and improved quality that creates a new untapped dimension and capacity to influence where none existed before. Audio device 22 provides the vocal cords and hence the ability to transmit a variety of verbal messages that emphatically improve the visual ones.

Thus message 12 (FIG. 2) is substantially enhanced with the capacity to play the tune, "Anchors Away", when activated by a buttons switch, or similar device.

Message 12 (FIG. 1) can be improved by providing a personal aural reminder from a family member, e.g. "come home after work because we want and need you". Such a message can be activated by a pressure-sensitive device. Button 10 can also host a frame for a family pictures providing a "safety guidance aura", as to what is truly important to the individual.

By combining a caricature, replica, or model-type image selected from the group consisting of a famous person, places or thing, a new use for buttons 10 and 20 is created in conjunction with their substantially latent and inert safety stimuli which has heretofore been left lying in the street.

OPERATION—FIGS. 1 TO 6

Buttons such as 10 and 20 have definite, positively perceived safety arousal traits, qualities, and stimuli. They have been used on highways for many years. More recently buttons such as 10 and 20 have seen service on airport runways, taxiways, and in fixed static motor traffic applications.

Improvements made have been solely based upon the specific line of fixed, static highway pavement guidance devices.

Over the years buttons such as 10 and 20 have established themselves as excellent safety guidance symbols with a long creditable family lineages without peer in fulfilling the difficult job requirement of highway safety.

Furthermore, buttons 10 and 20 have proven to be ever vigilant sentinels in dangerous high risk traffic areas, making drivers cognizant of their surroundings. Buttons 10 and 20 have proven to be a positive trigger, a caution-conditioning element that influences motoring behavior and driving habits.

Thus these buttons, having previously provided positive intrinsic safety arousal stimuli, can be linked with other symbolic items, as a "safety catalyst", to produce a more vivid image. This image is synergistically safety charged by "application through association" with the safety generating stimuli of buttons 10 and 20. They function as safety catalysts for traveling life's superhighway in the mind's eye.

Organizations wishing to generate a safety aura have a new tool at their fingertips when buttons 10 and 20 are improved and modified in the manner portrayed in FIGS. 1 to 6. A new safety generating tool whose inherent arousal stimuli have been building and "germinating" on roads and highways—the clear exception being the imaginary highway of life.

Summarily, the mundane and heretofore static highway lane delineator buttons 10 and 20 that generate safety guidance on the highway can now provide greater stimulating use of their inherent safety arousal traits and qualities as safety sentinels or guides, for traversing the imaginary highway of life with greater safety awareness. They provide the core to capitalize on and exploit previously learned safety lessons, thus promoting the very important theme of safety. They are generic safety catalysts with a completely new highway requiring their expertise, i.e., the superhighway of life.

The use of these buttons, in this manner, broadens overall safety awareness for traveling life's highway.

The device of FIGS. 1 and 2 visually condenses safety perceptions within the human mind. This novel use of buttons 10 and 20 in this manner cohesively adds blends, and melds the many safety connotations required of a winning car and driver combination. Additionally, the displayed logos on a racecar acquire an added aura of safety through association.

Figure 5:
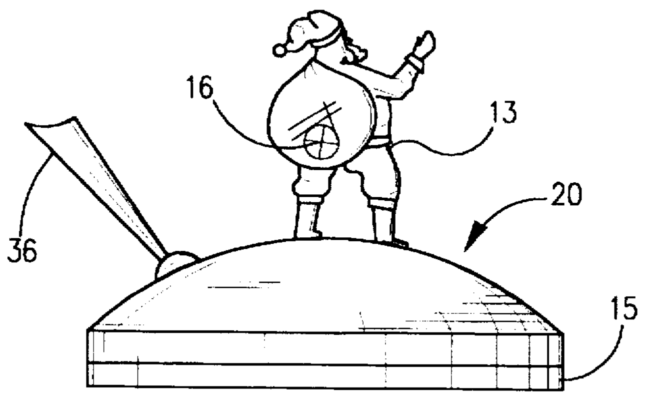
FIG. 5 is a front elevational view of the device of FIG. 2 with a mounted cartoon caricature according to the invention.

FIG. 5 is a front elevational view of button 20 with a mounted cartoon caricature 13 along with a plaque 30 (not shown). Plaque 30 can display for message 12 such as, "When You Go From Place To Place Around The Globe, It Pays To Carry METLIFE". METLIFE is a registered trademark 16 of Metropolitan Life Insurance Co., New York, N.Y).

Figure 6:
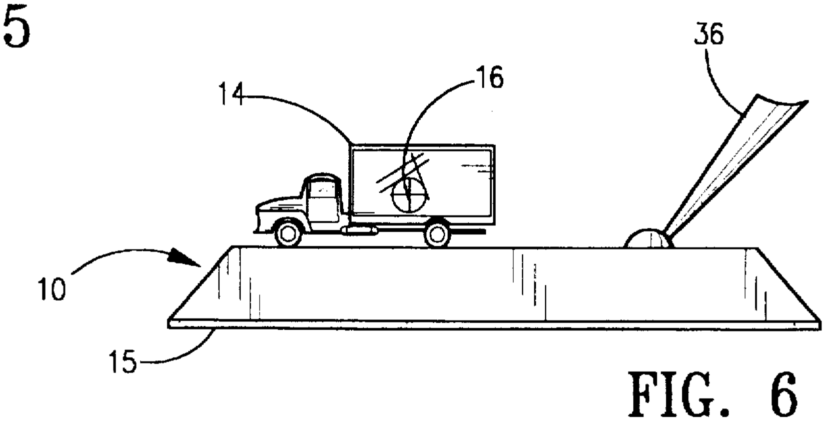
FIG. 6 is a front elevational view of a model-type replica used as a desk ornament according to the invention.

There are occasions where vivid safety oriented advertising with a color, or colors, is definitely motivating and enlightening For example, FIG. 6 is a front elevational view of button 10 with one red reflective side and one silver reflective side in a white housing. In conjunction, Coca-Cola® uses a red/white/silver, swirl/wave for effect in some of their advertising. Also mounted on button 10 is a model-type replica 14 antique Coke® truck with a plaque 30 (not shown). Plaque 30 can display for message 12 a slogan, such as "CATCH THE WAVE ALONG LIFE'S BUSY HIGHWAY, AND ENJOY THE PAUSE THAT REFRESHES! COCA-COLA®." Or message 12 can state, "IF YOU MUST DRINK AND DRIVE, MAKE IT COCA-COLA®!", Love Mom & M.A.D.D.*. Some Coca-Cola® products have caffeine, an acknowledged positive stimulant helpful to motorists. When trademark 16 is "Coca-Cola" it is a powerful symbol the world over with an added safety aura. Safe driving awards for Coca-Cola® truck drivers in the manner depicted in FIG. 6 is concisely appropriate (Coca-Cola and Coke are registered trademarks of Coca-Cola Co., Atlanta, Ga., *Mothers Against Drunk Driving).

Padding 15 below buttons 10 and 20 significantly changes their structure and operation, and provides the foundation to function as highway of life guide markers. Further pen funnel 36, audio device 22, plaque 30, and message 12, along with other accoutrements (13, 14, 16), opens new avenues where safety orientation is the theme.

CONCLUSION, RAMIFICATIONS, AND SCOPE

While I have shown and described certain presently preferred embodiments of the invention and have illustrated presently preferred methods of practicing the same, it is to be understood that the invention is not limited thereto but may be embodied and practiced in other ways within the spirit and scope of the invention. For example:

Retirement or individualist style mementos can be made from used and worn, though serviceable, buttons 10 and 20 which are currently discarded. As they acquire their own wear patina it is possible to create a standards yet desireable memento for truck drivers, highway patrolmen etc., with symbolic attachments, informational phrases and quips appropriate to specific occupations or organizations.

Religious applications can use quotes from the Bible, Torah, Koran, etc, or generic, such as, "The Will Of God Will Never Lead You, Where the Grace Of God Cannot Keep You."

Health applications, such as using a yellow, used and worn button 20 with a warning message 12, "SURGEON GENERAL'S WARNING: CIGARETTE SMOKE CONTAINS CARBON MONOXIDE". JUST LIKE AN AUTOMOBILE EXHAUST AND THAT CAN KILL YOU! The weatherworn, road-stained yellow of button 20 represents the harmful effects of nicotine use. The correlation to an automobile exhaust intensifies the visual message.

Humorous yet serious applications, such as, "Remember, Travel Life's Highway With Care, and Always In Clean Underwear! Love Mom".

"Jiggle Bars" and "Channel Markers" which are generally used around toll booths, specified parking, or in other special applications, are approximately 156 mm×156 mm (6"×6"), and 156 mm to 208 mm (6" to 8"), substantially in the manner outlined, may be used as desk ornaments, wall plaques, etch, structurally functioning as highway of life safety catalysts, awards, or giftware.

Highway buttons, jiggle bars, and channel markers may be modified structurally to function as, "highway of life safety catalysts". As a safety catalyst base, they can be used to host many symbolic items, such as a caricature, replica, or miniature-type structure or image of a famous or well-known person, place, or thing; from "A" to "Z", and numerals.

The device may be colored orange, yellow, blue, red, green, white, and/or silver. Also color combinations and custom colors, making the device suitable to specific applications, such as, in the trucking industry with; Yellow Transportation's Swamp Holly Yellow; Consolidated Freightway's, Red/Green combination; Roadway Transportation System's Blue/Orange combination.

Thus the scope of the invention should be determined by the appended claims and their legal equivalents rather than by the examples given.

I claim:

1. An article of manufacture which provides a plurality of functions, comprising:

a reflective highway pavement lane delineator marker button which provided a base or pedestal;

a padding or cushioning means on an underside of said base or pedestal for preventing marring when said base or pedestal is placed upon a surface; and a desk-pen funnel for holding a writing instrument, said funnel being substantially mounted upon a surface of said marker buttons.

2. The article of manufacture of claim 1, further including a plaque mounted on said base or pedestal for providing indicia or information thereon.

3. The article of manufacture of claim 1, further including a audio device mounted on said base or pedestal.

4. The article of manufacture of claim 1, further including a caricature, replica or image mounted on said base or pedestal.

5. The article of manufacture of claim 1 wherein said marker button has a symmetrical shape when seen from above.

6. The article of manufacture of claim 1 wherein said marker button has a rectangular shape when seen from above.

7. The article of manufacture of claim 1, wherein said marker button has a circular shape when seen from above.

8. The article of manufacture of claim 1 wherein said marker button has a symmetrical shape when seen from above and has a trademark thereon.

9. The article of manufacture of claim 1 wherein said marker button has a rectangular shape when seen from above and has a trademark thereon.

10. The article of manufacture of claim 1 wherein said marker button has a circular shape when seen from above and has a trademark thereon.

11. A highway derived decorative promotional advertising tool, comprising, in combination:

a display stand, base, or pedestal selected from the group consisting of a conventional highway pavement lane delineator marker button, a jiggle bar, or a channel marker, which provides a support means;

an audio device mounted upon said marker button, jiggle bare or channel marker;

a plaque having information there on, said plaque being placed upon said marker button, jiggle bar, or channel marker;

a padding or cushioning means on an underside of said marker button, jiggle bar, or channel marker for preventing said base or pedestal from marring a surface;

a desk-pen funnel for holding a writing instrument, said funnel being mounted upon a surface of said marker button, jiggle bar, or channel marker; and a caricature, replica, or image mounted upon said marker button, jiggle bar, or channel marker.

12. The advertising tool of claim 11 wherein said marker button, jiggle bar, or channel marker has a symmetrical shape when seen from above.

13. The advertising tool of claim 11 wherein said marker button, jiggle bar, or channel marker has a rectangular shape when seen from above.

14. The advertising tool of claim 11 wherein said marker button, jiggle bar, or channel marker has a circular shape when seen from above.

15. The advertising tool of claim 11 wherein said marker button, jiggle bar, or channel marker has a symmetrical shape when seen from above and has a trademark or tradename thereon.

16. The advertising tool of claim 11 wherein said marker button, jiggle bar, or channel marker has a rectangular shape when seen from above, and has a trademark or tradename thereon.

17. The advertising tool of claim 11 wherein said marker button, jiggle bar, or channel marker has a circular shape when seen from above, and has a trademark or tradename thereon.

18. A process for making an article having decorative and/or advertising and/of motivational features, by joining elements in combination, said process comprising steps of:

(a) providing the element of a conventional highway pavement lane delineator marker button, jiggle bar or channel marker, which provides a base or pedestal of said article;

(b) providing the element of a plaque bearing indicia or information, (c) providing the element of a caricature, replica or image;

(d) providing the element of an audio device;

(e) providing the element of a padding or cushioning means;

(f) providing the element of a desk-pen funnel for holding a writing instrument mounted on a surface area of said marker button, jiggle bar or channel marker, and which further provides a gripping point for movement of said marker button, jiggle bar, or channel marker; and (g) joining the elements together to make said article such that the elements provided by steps, (b), (c), (d) and (f) are mounted on said base or pedestal provided by step (a), and the element of step (e) is on an underside of said base or pedestal.

* * * * *